UNITED STATES PATENT OFFICE.

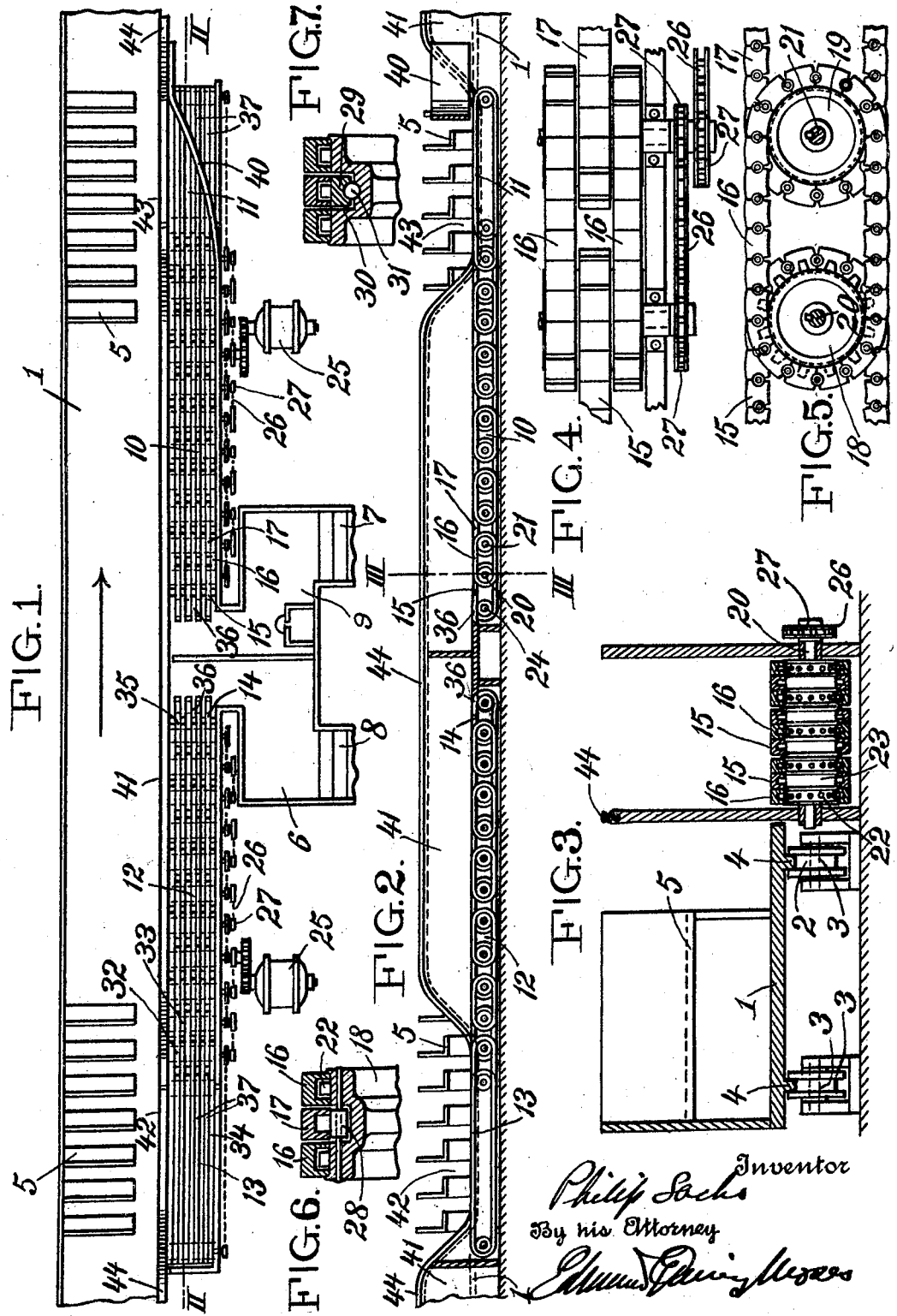

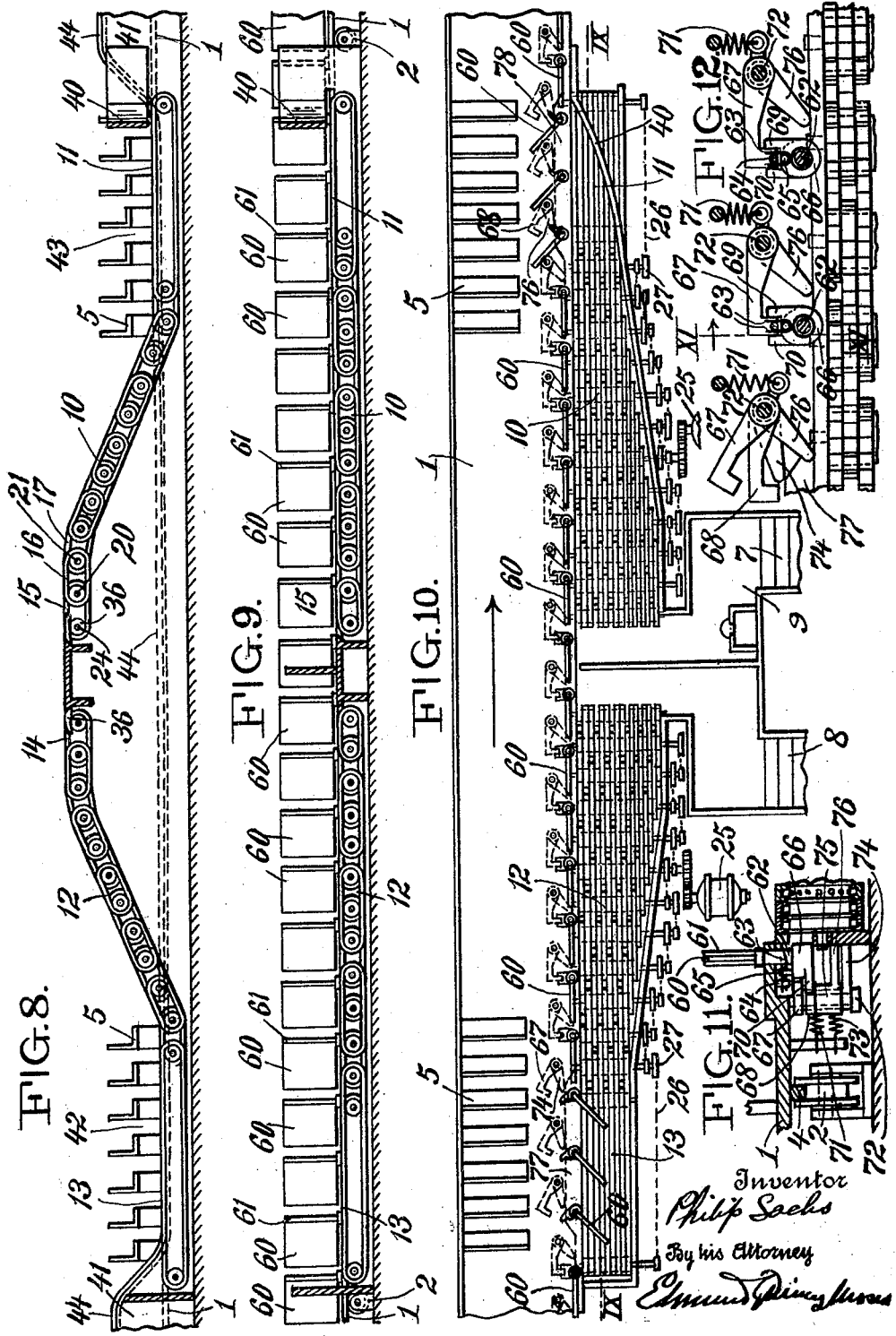

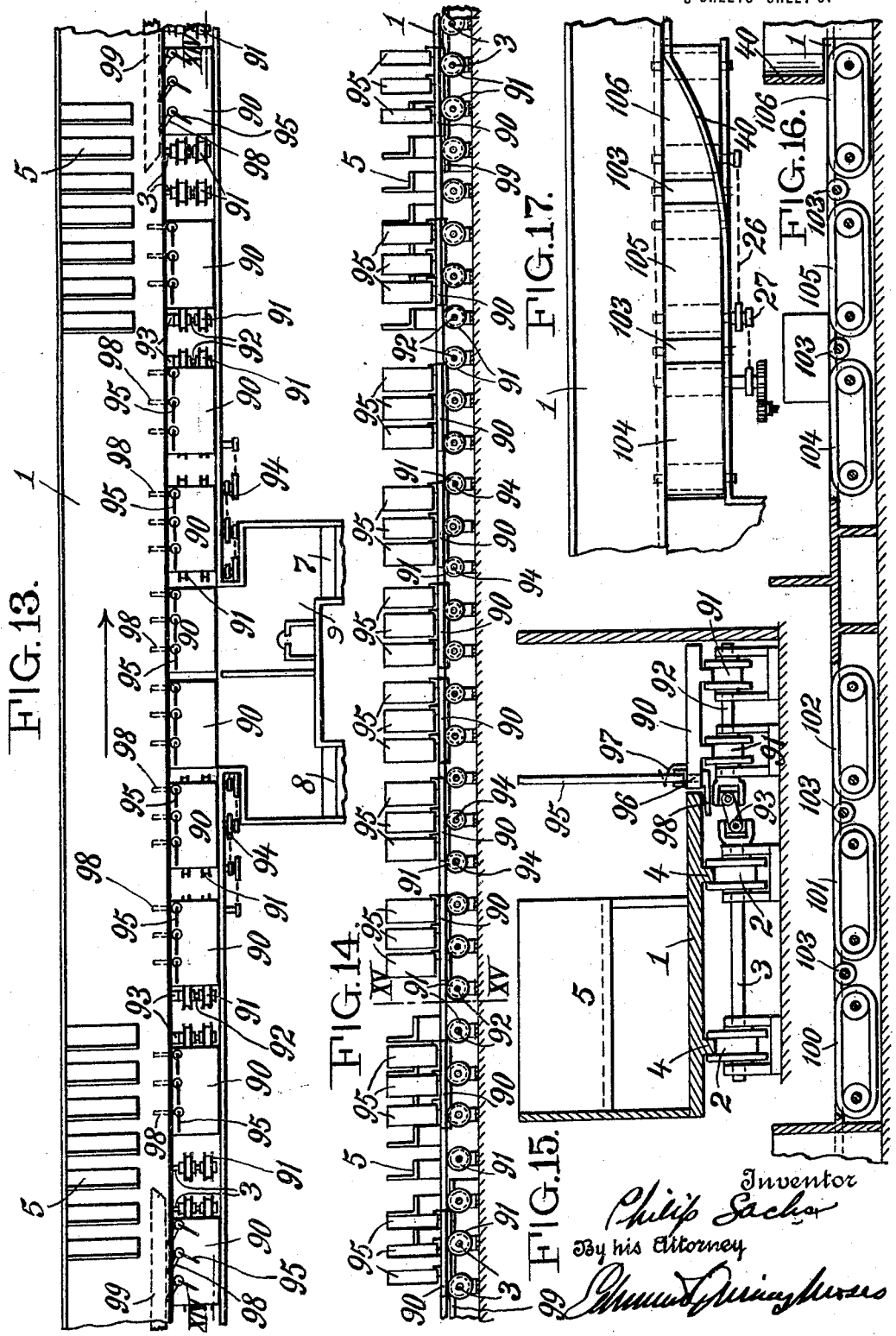

PHILIP SACHS, OF NEW YORK, N. Y.

SYSTEM OF TRANSPORTATION.

1,412,969.   Specification of Letters Patent.   Patented Apr. 18, 1922.

Application filed August 14, 1918. Serial No. 249,763.

*To all whom it may concern:*

Be it known that I, PHILIP SACHS, a citizen of the United States, residing at New York, in the county of New York and State of New York, have invented certain new and useful Improvements in Systems of Transportation, of which the following is a specification.

This invention relates to a system of transportation and is applicable in its broader aspects to the transportation or conveyance of either passengers or freight.

The invention contemplates particularly certain improvements in systems of the character commonly referred to as the moving platform type in which a continuously moving platform or conveyor is employed, and it has special reference to improvements in the mode of accelerating the movement of the passengers or freight to permit their transference to the main conveyor and of retarding such movement so as to permit unloading of freight or discharge of passengers.

In most moving platform systems as heretofore proposed, provision has been made for loading and unloading by means of a plurality of auxiliary platforms traveling adjacent to the main platform but at successively lower speeds so that a passenger may step on to a platform moving slowly and by stepping laterally from platform to platform gradually reach the platform of highest speed. Such an arrangement, however, has certain serious drawbacks, among which may be mentioned the great expense involved in providing a plurality of traveling platforms extending throughout the length of the system, and the inconvenience attendant upon successively stepping laterally from one platform to another traveling at a higher or lower rate of speed. By my invention, I overcome these objections and provide loading and unloading stations where the acceleration and retardation of the passengers or freight, after being once initiated, is accomplished automatically by a longitudinal movement rather than by lateral movement from one surface to another surface traveling at a different speed. The acceleration or retardation takes place in the direction of travel and is preferably accomplished without requiring any special effort or attention on the part of the passenger. It may also be accomplished either by a steady or uniform acceleration or retardation involving no abrupt changes in speed or the successive steps in the acceleration or retardation may be made so gradual as to substantially accomplish this result. The inconvenience and danger attendant upon sudden changes in speed are thus eliminated.

Various instrumentalities may be employed for carrying out my invention, some of which I have shown in the drawings accompanying and forming a part of this specification for the purpose of illustrating the principle of the invention and the best mode now known to me for performing the same.

In these drawings:

Figure 1 is a diagrammatic plan view showing one mode of carrying out the invention as applied to a moving platform system especially adapted for passengers, and showing a station provided with retarding means for the discharge of passengers and accelerating means for loading the passengers.

Figure 2 is a vertical section of the construction shown in Figure 1, taken on line II—II of Figure 1.

Figure 3 is a transverse vertical section taken on line III—III of Figure 2, on an enlarged scale.

Figure 4 is a detail plan view on an enlarged scale of a part of the loading platform.

Figure 5 is a view of the same parts in longitudinal vertical section.

Figures 6 and 7 are detail views in transverse vertical section showing constructions of pulleys for the accelerating or retarding elements.

Figure 8 is a view similar to Figure 2 illustrating a modified construction in which the loading and unloading platforms also elevate or lower the passengers.

Figure 9 is a view in longitudinal section of another modified form of the invention taken on line IX—IX of Figure 10.

Figure 10 is a plan view of the construction shown in Figure 9.

Figure 11 is a transverse vertical section on an enlarged scale illustrating certain features of the invention, particularly the door locking mechanism, the section being taken on line XI—XI of Figure 12.

Figure 12 is a plan view of part of one of the loading or unloading platforms illustrating particularly the door locking mechanism.

Figure 13 is a plan view of another modified construction embodying my invention.

Figure 14 is a longitudinal sectional view of the construction shown in Figure 13, taken on line XIV—XIV of said Figure.

Figure 15 is a transverse vertical section on an enlarged scale taken on line XV—XV of Figure 14.

Figure 16 is a longitudinal vertical sectional view illustrating a modified construction especially applicable to the transportation of freight.

Figure 17 is a plan view of a part of the mechanism shown in Figure 16.

Referring to the drawings in detail and particularly to Figures 1 to 7, the main transporting element of the system shown comprises a moving platform 1 which may be of any suitable construction and which is arranged to be continuously driven in any suitable manner at as high a rate of speed as is practicable and desirable. As illustrated, the platform 1 is arranged to travel on a series of rollers 2 mounted on shafts 3, and is provided on its under surface with rails 4 for engagement with the rollers. If desired, the platform may be provided with seats 5.

At suitable intervals along the line of the main platform, means are provided for loading and discharging passengers. For instance, if the main platform is located in a subway, a fixed station platform 6 may be provided having an entrance stairway 7 and an exit stairway 8. The entrance stairway communicates with an entrance platform 9 from which leads a compound acceleration surface or platform 10, the various elements of which gradually increase in speed until the terminal zone 11 thereof is reached which preferably has a speed equal to that of the main platform 1. On the opposite side of the station is a retardation platform 12, the discharge zone 13 of which also has a speed substantially equal to that of the main platform.

In the construction illustrated the acceleration and retardation platforms comprise series of overlapping or interlocking endless belts driven at progressively varying speeds. Thus the acceleration platform begins with a series of short belts 15 adjacent to the stationary platform 9 and traveling at a low rate of speed, for instance, one mile an hour. These belts are narrow and are spaced apart sufficiently to receive between them a second series of belts 16 driven at a slightly higher speed, for instance, two miles an hour. A third series of belts 17 runs between or dove-tails with the series of belts 16, successive series being provided in like manner, each being driven at a somewhat higher speed than the preceeding one up to a series of longer belts constituting the loading zone or platform 11, these longer belts preferably being driven at the same rate of speed as the main platform 1.

As illustrated particularly in Figures 3, 4, and 5, the belts of each series run over pulleys at each end mounted on common axes with the pulleys over which run the belts of the next adjacent series of higher and lower speeds respectively. The belts of each series are arranged to be driven by the pulleys over which they run at one end and to travel freely over the pulleys at the other end. Thus, referring to Figures 3, 4, and 5, the belts 16 run over pulleys 18 and 19 mounted on shafts 20 and 21 respectively. Each of the pulleys is provided with grooves for the respective belts, the grooves for one set of belts being provided with teeth and for the adjacent set of belts being smooth. For instance, the pulley 18 is provided with teeth 22 in each of the grooves in which runs one of the belts 16, so that all of these belts are positively driven at the speed of rotation of this pulley and of the shaft 20. On the other hand the alternate grooves 23 in which run the belts 15 are not toothed but are smooth so as to permit the belts 15 to slide therein, the belt 12 being driven by toothed pulleys on the shaft 24 (see Figure 2). The belt 16 runs in smooth grooves in the pulley 19 on the shaft 21, the pulley 19 having teeth in alternate grooves which engage the belts 17 so as to positively drive them at the speed of the shaft 21. In this way it will be seen that the speed of each shaft controls the speed of one series of belts and by driving the shafts at progressively increasing speeds, the various series of belts are successively driven faster and faster so as to produce the proper acceleration for the passenger or object moving over the compound platform. The shafts may be operated in any suitable manner as by means of an electric motor 25 (see Figure 1) which drives the successive shafts through chains and sprockets 26 and 27, the sprockets being properly proportioned in size to produce the desired speed ratios.

Figures 6 and 7 illustrate modified constructions of the carrying and driving pulleys for the belts. Figure 6 shows alternate belts mounted on portions of the pulley provided with teeth 22, the intermediate belt running over a series of rollers 28 so as to permit free movement between this belt and the pulley. In Figure 7 the intermediate belt is shown as being mounted upon an annular supplemental pulley 29 running in a groove 30 in the main pulley upon ball bearings 31. Various other constructions of belts and pulleys may be utilized.

The construction of the unloading devices is similar to that of the loading devices described except that the successive series of belts 32, 33, etc., between the belts 34 in the discharge zone 13 and the stationary exit platform 14 are driven at progressively slower speeds down to that of the series of belts 35 adjacent to the exit platform which runs at the slowest speed of any, for instance, at a speed of one mile an hour.

The surfaces of the fixed platforms 9 and 14 adjacent to the slow moving belts are preferably provided with tongues 36 which extend between the ends of belts 15 and 35 respectively adjacent to the fixed platforms, so as to form a sort of grating filling up the spaces between the ends of the belts and thus making substantially continuous surfaces at these points which lessens the danger of any object catching between the platforms and the moving belts. The platforms in the zones 11 and 13 may also be made continuous by providing additional belts slightly shorter than the belts which dove-tail with the belts forming the next succeeding platform section, and which thus fill up the spaces between such longer belts. These filling belts are shown in Figure 1 at 37.

At the end of the loading platform where the belts are moving at the same speed as the main platform 1, a curved wall or deflector 40 is preferably provided as shown in Figures 1 and 2, this deflector serving to direct the passengers upon the main moving platform before the end of the loading platform is reached in case they fail to step across voluntarily at the proper time.

In order to prevent the passengers from accidentally stepping off the main platform 1 between stations and also to prevent them from attempting to step on or off of the main platform except at the intended points opposite the zones 11 and 13, suitable means are provided such as the wall or partition 41 which is cut out to provide openings 42 and 43 adjacent to the zones 13 and 11, respectively. Preferably the wall 41 is surmounted by a traveling hand rail 44, which moves at the speed of the main platform and which is carried down the inclines adjacent to the openings 42 and 43 and passes across these openings at the level of the platforms. This moving hand-rail serves as a warning or reminder to a passenger desiring to leave the main platform as if he is holding on to the same, he will feel it going down from under his hand and know that an exit opening has been reached.

In the operation of the construction described, it will be seen that the passenger has merely to step from the stationary entrance platform 9 on to the slow moving series of belts 15 which will at once transfer him to the next succeeding series, the process being continuel without further effort on his part until he reaches the zone 11 where his speed is equal to that of the main platform 1. He may then step across to the platform 1 or be directed upon the same by the deflector 40, this platform carrying him to his destination at an adequate speed. Upon reaching the station where he desires to get off, it is merely necessary for him to step from the main platform through the opening 42 on to the zone 13, the moving belts of which transfer him to the slower moving belts which gradually reduce his speed until he steps or is discharged upon the fixed platform 14. As the zone sections 11 and 13 travel at the same speed as the main platform, the discomfort of stepping laterally from a platform moving at one speed to a platform moving at a different speed is obviated. As the successive accelerating and retarding platform sections may be very short, a sufficient number of them may be utilized to make the speed change between the successive sections very small, without causing a material increase in the length of the station. The loading and unloading means are also localized at desired stations and the only element of the system which extends the whole length thereof is the single moving platform 1. The cost of the system may thus be kept within reasonable limits.

In Figure 8 a modification of the construction shown in Figure 1 is illustrated, which consists in making the acceleration and retarding platforms also elevate and lower the passengers or freight. For instance, if the main moving platform is located in a subway, the acceleration or entrance platform 10 may start at the street level and descend at a gradual incline to the level of the main platform, at the same time increasing the speed of the passenger so that when he reaches the level of the main platform, he may step at once thereonto. On the other hand, when leaving the main platform, he may step on to the zone 13 which transfers him to the retarding platform 12, the latter reducing his speed and at the same time carrying him up to the street level. Another advantage of this construction is that the only part of the accelerating and retarding platforms which are at the same level as the main platform are those parts which are moving at substantially the same speed as the main platform so that a passenger can step across only at such parts, the difference in the elevation of the remaining portions of the platforms serving as a guard to prevent stepping across at an improper point. Other guard means such as a fixed wall or gates may accordingly be dispensed with, if desired.

In Figures 9 to 12, I have illustrated diagrammatically another modification of my invention embodying a somewhat different form of the accelerating and retarding platforms by which a practically continuous gradation in speed may be achieved and also illustrating a form of door construction which may be utilized.

Referring first to the platform construction, this is similar to that already described except that the belts forming the platform overlap to a considerable extent so that in every part of the platform surface there are belts moving at at least two different speeds. Thus, referring to the drawings, it will be seen that the belts do not run over pulleys on adjacent shafts but that each series of belts skips one (or more) shafts and run over pulleys on alternate shafts. As shown, the first series of belts runs over pulleys on the first and third shafts, the next series over pulleys on the second and fourth shafts and the following series over pulleys on the third and fifth shafts. Thus portions of the first and second series of belts are running side by side across the spaces between the second and third shafts while portions of second and third series of belts form the platform surface between the third and fourth shafts, etc. As the difference in speed between the successive series of belts is very small, however, there is no unpleasant sensation as a result of the compound movement thus produced but on the other hand, a continuous gradation of speed results. Various combinations and arrangements of the belts may be utilized to accomplish substantially this result.

I have also shown in Figure 10, how the acceleration and retarding platforms 10 and 11 may be graduated in width so as to enlarge the capacity of the system. The slow moving parts of the platforms are made wider by providing additional belts.

Figures 9 to 12 also illustrate a door construction of such nature as to prevent passengers from stepping on or off the main moving platform 1 except opposite the zones 11 and 13 respectively where the loading and discharge platform surfaces are traveling at substantially the same rate as that of the main platform. The means which I have shown for accomplishing this result comprises a series of doors 60 extending along the entire length of the moving platform and arranged to be locked shut except at the proper points. Each door 60 is illustrated as mounted upon a vertical pivot 61 and is capable of swinging in either direction about such pivot but is normally returned to a closed position by suitable means such as a double acting spring 62 having a loop surrounding the lower end of the pivot 61 and having a pair of arms 63 between which are received a fixed pin 64 on the platform 1 and a movable pin 65 carried by a block 66 on the lower end of the pivot 61. The movement of the door in either direction from the normal closed position will cause the pin 65 to press against one of the spring arms thereby stressing the spring which will restore the door to normal position as soon as the force upon the door is relieved. In order to lock the doors against movement except in the proper direction at the proper time, automatic locking means are provided which are released only when the doors are opposite the zones 11 and 13. The locking means illustrated comprise a pair of locking dogs 67 and 68 adapted to engage respectively with lugs 69 and 70 projecting from the block 66 on the door pivot. Thus lugs are oppositely disposed as shown in Figure 12, the engagement between the dog 67 and the lug 69 preventing the outward movement of the door so as to prevent a passenger from stepping off the main platform 1, while the engagement between the dog 68 and lug 70 prevents the inward movement of the door. When each dog is in engagement with its respective lug, the door is locked against movement in either direction; while if one or the other of the dogs is released, the door is permitted to swing in one direction or the other as the case may be. The dogs are normally maintained in locking engagement with the lugs by the action of the springs 71. In order to release the dogs, the latter are mounted on concentric sleeves journaled upon the pin 72 carried by the main platform. The dog 67 is carried on an inner sleeve 73 which has at its lower end an operating arm 74 while the dog 68 is carried on the sleeve 75 having an operating arm 76. The arms 74 and 76 are arranged at different levels and are designed to cooperate with fixed cams or tripping rails 77, 78 arranged at corresponding levels and located adjacent to the discharge and loading zones 13 and 11 respectively. When the door locking mechanism on the platform 1 reaches a position opposite the zone 13, the tripping rail 77 is engaged successively by the arms 74 so as to trip the dogs 67, thus permitting the doors to swing outwardly when pressed against by the passengers so as to allow the passengers to step from the platform 1 on to the discharge platform. As soon as the passengers have stepped through the doors, the latter will be closed by the springs 62 and as soon as the doors pass beyond the zone 13, the dogs 67 are brought back into action and will lock the doors against movement in either direction until the doors come opposite the zone 11. The arms 76 then successively engage the tripping rail 78 which releases the dogs 68 thereby permitting passengers on the loading platform zone 11 to push the doors inwardly and step on the main moving platform 1. Any other suitable arrangement of doors, turnstiles or equivalent means may be utilized in place of the specific example described.

In Figures 13 to 15, I have illustrated another form of my invention in which the loading and unloading of the main platform is accomplished by means of a series of auxiliary platforms which travel parallel to the main platform, preferably throughout the length of the latter, but which are retarded adjacent to the stations to permit the discharge and taking on of passengers or freight and are then accelerated until they attain the speed of the main platform, thus permitting the passengers to pass over to the main platform and from the latter to the auxiliary platforms preparatory to getting off at the next station.

Referring to the drawings, 1 is the main platform which travels on rollers 2 as already described, these rollers being mounted on shafts 3. 90 are the auxiliary platforms which travel on rollers 91 mounted on shafts 92. The platforms 90 travel at the same speed as the platform 1 intermediate the stations, the driving of the auxiliary platforms being accomplished in any suitable manner, for instance, by connecting the shafts 3 and 92 so that they turn together and making the rollers 91 the same size as the rollers 92. When it is desired to slow up the platform 90 on approaching a station, the rollers may be made smaller than the rollers 92 as shown in Figure 15, the shafts 3 and 92 being connected by universal couplings 93. For a still slower movement of the auxiliary platforms, a separate drive is preferably provided for the shafts 92 as shown at 94 in Figure 13. The platforms 90 may be brought to a complete stop at the stations if desired but preferably are merely reduced to a very low speed which permits passengers to readily step off or on. In this way, the movement of the platforms while slow is continuous and no special starting or stopping devices are required. When the auxiliary platforms are traveling at the same speed as the main platform, they are spaced apart a considerable distance so as to provide for the reduction of speed at the stations without collision. Doors 95 may be provided on the auxiliary platforms 90 which are closed whenever the speed of the auxiliary platforms is lower than the speed of the main platform so as to prevent passengers moving from one platform to the other except when the auxiliary platforms are moving at or near the same speed as the main platform. Any suitable means for controlling the doors may be utilized; for instance, the doors may be mounted on pivots 96 and be yieldingly held in closed position by springs 97. The pivots 96 are provided with arms 98 which are adapted to be engaged by the fixed cam rail 99 extending along that part of the system where the speed of the auxiliary platforms is the same as that of the main platform. Where this condition exists therefore, the doors will be held open, thereby permitting passengers to pass freely between the auxiliary and main platforms; while in other parts of the system where the speed of the auxiliary platforms is less than that of the main platform, the doors will be closed by the springs.

In Figures 16 and 17 I have shown another modification of my invention especially adapted to the handling of freight. As here illustrated, a series of belts running at different speeds and arranged end to end are provided for retarding or accelerating the freight when being unloaded from or loaded upon the main platform or conveyor. The main platform is shown at 1 and a series of retarding belts at 100, 101 and 102, the belt 101 moving slower than the belt 100 and belt 102 moving slower than the 101. The belts do not interlock or dovetail as in the constructions previously described which are especially desirable for passengers. The spaces between the adjacent belts where they pass around the pulleys may be filled by idle rollers 103. A series of accelerating belts 104, 105 and 106 is also provided. For freight the changes in speed need not be so gradual as for passengers and a smaller number of steps is sufficient.

While I have shown and described in detail certain preferred embodiments of my invention as illustrative of the principle thereof, I realize that my invention may be embodied in many other ways and I do not desire to be limited to the particular construction and mode of operations set forth but intend to cover my invention broadly in whatever form its principle may be embodied.

Having thus described my invention, I claim:

1. In a system of transportation, the combination with a main conveying element of a stationary platform at one side thereof, and means for transferring persons or objects from said platform to said conveying element or vice versa; said transferring means including a series of actuating means arranged in alignment and operating at relatively varying speeds, and auxiliary conveying means actuated by said actuating means.

2. In a system of transportation, the combination with a main conveying element of a plurality of actuating means arranged in longitudinal alignment at one side of said main conveying element and operating at relatively varying speeds, and transfer means actuated by said actuating means.

3. In a system of transportation, the combination with a main conveying element of a plurality of longitudinally aligned actuating means arranged at one side of said main conveying element and operating at relatively varying speeds, and transfer means actuated by said actuating means.

4. In a system of transportation, the combination with a main conveying element, of transfer means therefor arranged in longitudinal alignment at one side of said main conveying element, various portions of said transfer means moving at relatively varying speeds in the direction of travel of said main conveying element.

5. In a system of transportation, the combination with a main conveying element, of transfer means arranged at one side of said main conveying element and having a series of portions in longitudinal alignment with each other and parallel to the main conveying element, said portions moving relatively to each other.

6. In a system of transportation, the combination with a main conveying element, of transfer means arranged at one side of said main conveying element and having a series of portions in longitudinal alignment with each other, said portions moving at relatively varying speeds in the direction of travel of the main conveying element, one portion moving at substantially the speed of the main conveying element.

7. In a system of transportation, the combination with a main conveying element, of transfer means arranged at one side of said main conveying element and having a series of portions in longitudinal alignment with each other, said portions moving relatively to each other, and certain of said portions serving to accelerate objects to be loaded upon the main conveying element and others of said portions serving to retard objects discharged from said main conveying element.

8. In a system of transportation, the combination with a main conveying element, of transfer means arranged in longitudinal alignment at one side of said main conveying element and having portions moving at relatively varying speeds, certain of said portions moving at substantially the same speed as the main conveying element, while others of said portions serve to accelerate objects to be loaded upon said main conveying element from said first mentioned portions.

9. In a system of transportation, the combination with a main conveying element, of transfer means arranged in longitudinal alignment at one side thereof and having certain portions moving at substantially the same speed as the main conveying element, while other portions move at relatively varying speeds to retard objects unloaded from the main conveying element to the first mentioned portions of the transfer means.

10. In a system of transportation, the combination with a main conveying element, of loading and unloading means therefor arranged alongside said main conveying element and comprising a fixed station platform, and a series of longitudinally aligned accelerating and retarding elements extending from said fixed platform in opposite directions.

11. In a system of transportation, the combination with a main conveying element, of loading and unloading means therefor arranged alongside said main conveying element and comprising a fixed station platform, and a series of longitudinally aligned accelerating and retarding elements extending from said fixed platform in opposite directions, the accelerating and retarding elements most remote from said fixed platform having speeds approximately equal to the speed of the main conveying element.

12. In a system of transportation, the combination with a main conveying element, of loading and unloading means therefor arranged alongside said main conveying element and comprising a fixed station platform, a series of longitudinally aligned accelerating elements extending from said fixed platform in the direction of movement of said main conveying element, and a series of retarding elements extending from said fixed platform in the direction opposite to the direction of movement of said main conveying element.

13. In a system of transportation, the combination with a main conveying element, of loading and unloading means therefor arranged alongside said main conveying element and comprising a fixed station platform, a series of longitudinally aligned accelerating elements extending from said fixed platform in the direction of movement of said main conveying element, and a series of retarding elements extending from said fixed platform in the direction opposite to the direction of movement of said main conveying element, the accelerating and retarding elements most remote from said fixed platform having speeds approximately equal to the speed of the main conveying element.

14. In a system of transportation, the combination with a main conveying element, of loading and unloading means therefor arranged alongside said main conveying element and comprising a fixed station platform, a series of longitudinally aligned accelerating elements extending from said fixed platform in the direction of movement of said main conveying element, and a series of retarding elements extending from said fixed platform in the direction opposite to the direction of movement of said main conveying element, the speed of the accelerating and retarding elements being arranged to increase in the directions away from said fixed platform, the most remote of said elements having speeds approximately equal to the speed of the main conveying element.

15. In a system of transportation, the combination with a main conveying element, of loading and unloading means therefor having a series of accelerating elements and another series of retarding elements, entrance to the accelerating series and exit from the retarding series being provided at substantially the same point.

16. In a system of transportation the combination with a main conveying element, of loading means therefor arranged at one side of said main conveying element and comprising a plurality of traveling supporting devices having a zone of operation in which the motion of an object thereon is constantly accelerated and having another zone of operation in which the speed of the object is substantially the same as that of the main conveying element, said zones being located in longitudinal sequence in the direction of movement of the main conveying element, the object being adapted to be transferred laterally from the loading means to the main conveying element.

17. In a system of transportation, the combination with a main conveying element, of transfer means therefor arranged at one side of said main conveying element, said transfer means comprising devices acting to produce successive changes in the speed of an object carried thereby in successive zones arranged in longitudinal sequence with respect to the direction of movement of the main conveying element.

18. In a system of transportation, the combination with a main conveying element, of a stationary platform, and loading and unloading means arranged at opposite ends of the platform and providing surfaces movable at low speeds in zones adjacent the stationary platform and at substantially the same speed as the main conveying element in other zones.

19. In a system of transportation, the combination with a main conveying element, of transfer means therefor various zones of which move at relatively varying speeds, certain zones thereof traveling at a speed so related to the speed of movement of the main conveying element as to permit transfer of objects from the transfer means to the main conveying element, and vice-versa, and means for preventing such transfer except in such zones.

20. In a system of transportation, the combination with a main conveying element, of transfer means therefor various zones of which move at relatively varying speeds, certain zones thereof traveling at a speed so related to the speed of movement of the main conveying element as to permit transfer of objects from the transfer means to the main conveying element, gate means for preventing such transfer except at such zones, and means for automatically opening said gates as the said zone is reached and closing the gates as the said zone is passed.

PHILIP SACHS.